(12) United States Patent
Suetsugu

(10) Patent No.: US 6,711,133 B1
(45) Date of Patent: Mar. 23, 2004

(54) METHOD FOR CONTROLLING CONGESTION IN ATM SWITCHING SYSTEM

(75) Inventor: Yasuyuki Suetsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/568,961

(22) Filed: May 11, 2000

(30) Foreign Application Priority Data

May 12, 1999 (JP) .......................................... 11/131304

(51) Int. Cl.[7] ................................................ H04L 1/00
(52) U.S. Cl. ..................................... 370/236.1; 370/413
(58) Field of Search ............................. 370/230.1, 235, 370/236, 236.1, 236.2, 413, 414

(56) References Cited

U.S. PATENT DOCUMENTS

| | | | | |
|---|---|---|---|---|
| 6,304,554 B1 | * | 10/2001 | Matsumura et al. | 370/236 |
| 6,324,165 B1 | * | 11/2001 | Fan et al. | 370/232 |
| 6,498,780 B1 | * | 12/2002 | Bavant et al. | 370/229 |
| 6,512,743 B1 | * | 1/2003 | Fang | 370/232 |

FOREIGN PATENT DOCUMENTS

| | | |
|---|---|---|
| JP | 9-83537 | 3/1997 |
| JP | 10-322344 | 12/1998 |

OTHER PUBLICATIONS

Japanese Office Action, dated Apr. 27, 2001, with English language translation of Japanese Examiner's comments.

* cited by examiner

Primary Examiner—Chau Nguyen
Assistant Examiner—Christine Ng
(74) Attorney, Agent, or Firm—Whitham, Curtis & Christofferson, PC

(57) ABSTRACT

A method is provided for controlling congestion in an ATM (Asynchronous Transfer Mode) switching system composed of a plurality of cell buffers incorporated in order to make its switching capacity large or to increase its cell buffer amount, which can ensure fair share among ABR (Available Bit Rate) connections passing through a same ATM switching system. In the method, a logical queue length in a cell buffer is monitored for every input side cell buffer section and logical queue length information is written into an idle field in RM cell or IRM (Internal Resource Management) cell and is transferred to an output cell buffer section. The output side cell buffer section is provided with a device adapted to calculate a degree of congestion from logical queue length information fed from each of input side cell buffer sections and to judge which input side cell buffer section has its most congested state. The output side cell buffer is provided with the device used to calculate the degree of the congestion in the output side cell buffer section itself by using logical queue length information. The congestion information in each of the input side cell buffers, the congestion information in the output side cell buffer itself and the congestion information contained in an RM (Resource Management) cell are compared and information indicating the most congested state out of three kinds of information is set to the RM cell.

2 Claims, 5 Drawing Sheets

FIG. 7

| | |
|---|---|
| input side cell butter section number | 3 octets |
| input side cell butter section logical queue number | 3 octets |
| input side cell butter section logical queue length | 3 octets |
| output side cell buffer section number | 3 octets |
| reserve | 18 octets |

FIG. 8A (PRIOR ART)

| | |
|---|---|
| ATM cell header<br>RM-VPC: VCI=6 and PTI=110<br>RM-VCC: PTI=110 | 5 octets |
| RM protocol discriminator | 1 octet |
| message type | 1 octet |
| ER | 2 octets |
| CCR | 2 octets |
| MCR | 2 octets |
| QL | 2 octets |
| SN | 2 octets |
| reserve | 30 octets<br>2 octets |
| reserve(6bit)+CRC10 | |

FIG. 8B (PRIOR ART)

| 8 | 7 | 6 | 5 | 4 | 3 | 2 | 1 |
|---|---|---|---|---|---|---|---|
| DIR | BN | CI | NI | RA | \multicolumn{3}{c}{reserve} |

METHOD FOR CONTROLLING CONGESTION IN ATM SWITCHING SYSTEM

BACKGROUND OF THE INVENTION

1. Field of the Invention

The present invention relates to a method for controlling congestion in an ATM (Asynchronous Transfer Mode) switching system containing an ABR (Available Bit Rate) service class in which rate control is made between end terminals by using an RM (Resource Management) cell.

2. Description of the Related Art

When an ATM connection for implementing an ABR service class is established between end terminals, a data sending terminal is operated to send data into which an RM cell is inserted periodically to a data receiving terminal. The data to be sent by the data sending terminal is composed of a sum of user data and the RM cell.

The data receiving terminal is operated to send received RM cell back by return to the data sending terminal. In some cases, the RM cell is newly created by an ATM switching system in addition to being created by the data sending terminal. While the RM cell is being sent back to the data sending terminal, the ATM switching system through which the RM cell passes is adapted to write necessary congestion information into the RM cell and the data sending terminal which receives returned RM cell is operated to adaptively adjust an ACR (Allowed Cell Rate) rate being a cell sending rate based on information written in the RM cell and to set an available throughput depending on traffic volume.

FIGS. 8A and 8B are diagrams showing formats of the RM cell defined by ATM Forum, a workgroup on ATM communication.

A first 5 bytes provided in the format are a standard ATM cell header. "PTI (Payload Type Identifier)=110" shown in the ATM cell header represents that the cell shown by this format is the RM cell.

A next 1 byte is an RM protocol discriminator used to discriminate a service using the RM cell. To an ABR is assigned "1". A following next 1 byte is a message type region which contains a DIR (Direction) element, BN (Backward explicit congestion Notification) element, CI (Congestion Indicator) element, NI (No Increase) element and RA (Request/Acknowledge) element as shown in FIG. 8B, each of the elements being composed of one bit.

The DIR element shows a direction in which the RM cell flows. If the RM cell flows from the data sending terminal to the data receiving terminal, "0" is assigned to the direction, which is referred to as a "forward direction" and the RM cell flowing in the forward direction is called a "forward RM cell". If the RM cell flows from the data receiving terminal to the data sending terminal, "1" is assigned to the direction, which is referred to as a "backward direction" and the RM cell flowing in the backward direction is called a "backward RM cell". The data receiving terminal, when receiving the forward RM cell, is operated to change the DIR element to "1" and then to send it back to the data sending terminal.

The BN element shows which has created the RM cell. The "0" represents that the RM cell has been created by the data sending terminal. The "1" represents that the RM cell has been created by the data receiving terminal or a switching section (the ATM switching system).

The CI element is used to inform the terminal of an occurrence of a congestion in a network. The CI is set when a switch detects the congestion or when the data receiving terminal had received a data cell with an EFCI (Explicit Forward Congestion Indication) bit being set to "1". If the CI of the receiving backward RM cell is "1", a sending rate must be reduced by the data sending terminal so as to be lower than that applied when the RM cell was received.

The NI element is used to prevent the data sending terminal from increasing its sending rate. If the NI of the receiving backward RM cell is "1", the sending rate must be kept by the data sending terminal so as not to be higher than that applied when the RM cell was received.

The RA element is a region not defined by the ATM Forum. Others are reserve regions.

The further next 2 bytes are an ER (Explicit Rate) region which first flows at maximum sending rate PCR (Peak Cell Rate) written by the data sending terminal in the forward direction, however, its sending rate is gradually decreased, while being sent back in the backward direction, by a switch on a connection, so as to be one permitted by the ATM switching system.

The next 2 bytes are a CCR (Current Cell Rate) region where a sending rate applied when this cell was sent by the data sending terminal is described. Another next 2 bytes are an MCR (Minimum Cell Rate) where a minimum sending rate set to a connection through which the RM cell flows is described. A further next 2 bytes are a QL (Quality Level) region which is defined by the ATM Forum but not used presently. Also, a further next 2 bytes are an SN (Service Node) region which is defined by the ATM Forum but not used as well. Other remaining reserve fields are idle fields for which a use purpose is not defined.

Each of the ATM switching systems on the ATM connection is adapted to renew resource management information concerning whether there has occurred congestion in the ATM switching system through which the backward RM cell passes, concerning a transfer rate ER (Explicit Rate) applicable for the ATM switching system or like.

If the congestion is judged to occur in the ATM switching system, the CI bit is set to "1". Moreover, if the ATM switching system is provided with a function to calculate the transfer rate ER, it is operated to select either the ER value calculated by the ATM switching system or the ER value already written in the backward RM cell, whichever is smaller, and to store a selected value into the ER region in the backward RM cell.

In an ABR rate control using the ER described above, for the purpose of calculating the ER value, it is necessary to know a state of a logical queue in a cell buffer. However, in a case of a system having a plurality of split cell buffers, since the sending rate is calculated independently for every cell buffer, a following inconvenience occurs. That is, in an ABR connection passing through the cell buffer having a low usage rate, it does not occur that the sending rate happens to be rewritten in the ATM switching system, however, in the ABR connection passing through the cell buffer having a high usage rate, it occurs that the sending rate happens to be rewritten in the ATM switching system having the high usage rate.

Thus, even among the ABR connections passing through a same ATM switching system, if the cell buffers through which above connections pass differ from each other, the sending rate of the cell is also different and, as a result, "fair share" cannot be ensured.

On another hand, by using a shared-memory type ATM switching system having a single cell buffer, the fair share can be ensured even among the ABR connections passing through the same ATM switching system. However, the shared-memory type ATM switching system has a problem in that it is difficult to make its switching capacity large or to increase its cell buffer amount due to factors such as an access speed of a memory used in the cell buffer.

SUMMARY OF THE INVENTION

In view of the above, it is an object of the present invention to provide a method for controlling congestion in an ATM switching system composed of a plurality of cell buffers incorporated in order to make its switching capacity large or to increase its cell buffer amount, which can ensure fair share among ABR connections passing through a same ATM switching system.

According to one aspect of the present invention, there is provided a method for controlling congestion in an ATM switching system containing an ABR service class and having a plurality of split input side cell buffer sections and a plurality of split output side buffer sections used to support rate control for congestion control of the ABR service class and to perform delay priority control and discard priority control, including steps of:

monitoring a logical queue length within a cell buffer of each of input side cell buffer sections, writing information about the logical queue length into an idle field of an RM cell or an IRM (Internal Resource Management) cell and transferring the information written in the RM cell or IRM cell to each output side cell buffer sections at a back portion.

In the foregoing, a preferable mode is one that wherein includes a step of calculating a state of congestion of each input side cell buffer section based on information about a logical queue length fed from each of the input side cell buffer sections and of judging which input side cell buffer section is most congested by using a device mounted on each of the output side cell buffers.

Also, a preferable mode is one that wherein includes a step of calculating a state of congestion of each output side cell buffer section itself based on information about a logical queue length of the output side cell buffer section by using a device mounted on each of the output cell buffer sections.

Also, a preferable mode is one that wherein includes steps of:

calculating the state of congestion of each input side cell buffer section based on information about the logical queue length fed from each of the input side cell buffer sections by using the device mounted on each of the output side cell buffer sections;

calculating the state of congestion of each output side cell buffer section based on information about the logical queue length of the output side cell buffer itself by using the device mounted on each of the output side cell buffer sections; and comparing information about congestion of each input side cell buffer section with information about congestion of the output cell buffer itself and with information about congestion contained in the RM cell or the IRM cell, rewriting the RM cell or the IRM cell with information indicating the most congested state out of three kinds of information about congested states and outputting rewritten the RM cell or the IRM cell by using the device mounted on each of the output side buffer sections.

BRIEF DESCRIPTION OF THE DRAWINGS

The above and other objects, advantages and features of the present invention will be more apparent from a following description taken in conjunction with accompanying drawings in which:

FIG. 7 is a diagram showing examples of setting information about a logical queue length; and FIGS. 8A and 8B are diagrams showing formats of an RM cell defined by ATM Forum.

DETAILED DESCRIPTION OF THE PREFERRED EMBODIMENTS

Best modes of carrying out the present invention will be described in further detail using various embodiments with reference to the accompanying drawings.

Embodiment

Figure 1:
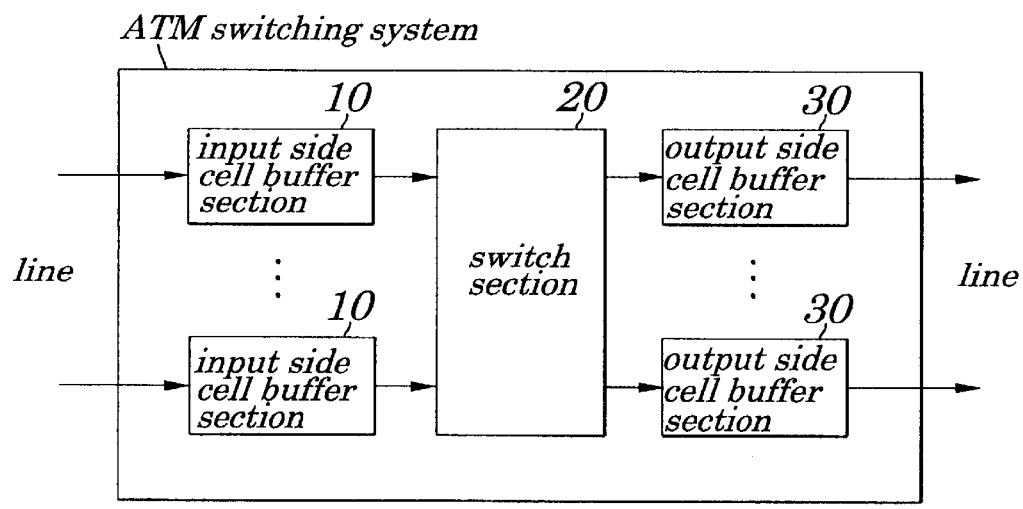
FIG. 1 is a schematic block diagram showing overall configurations of an ATM switching system according to one embodiment of the present invention.

FIG. 1 is a schematic block diagram showing overall configurations of an ATM switching system according to one embodiment of the present invention. As shown in FIG. 1, the ATM switching system is chiefly composed of cell buffer sections on an input side 10 (hereinafter referred to as "input side cell buffer sections" 10), cell switching section 20 (hereinafter referred to as "switching section" 20) and cell buffer sections on an output side 30 (hereinafter referred to as "output side cell buffer sections" 30).

Figure 2:
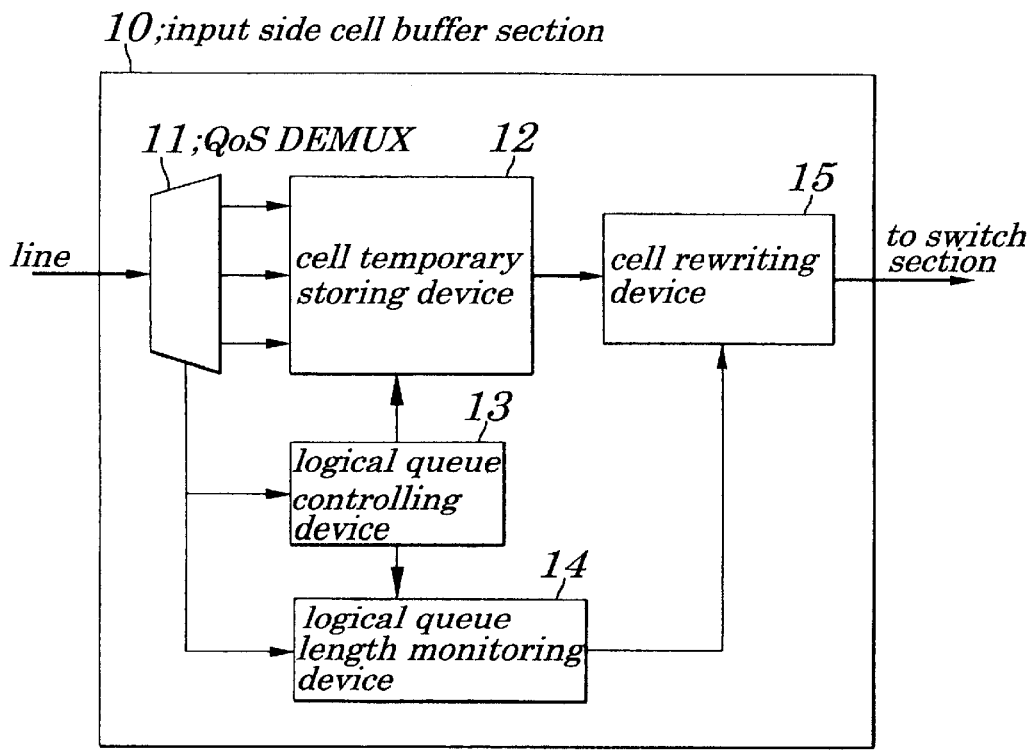
FIG. 2 is a schematic block diagram showing an example of configurations of a cell buffer section on an input side constituting the ATM switching system according to the embodiment of the present invention.

FIG. 2 is a schematic block diagram showing an example of configurations of the input side cell buffer section 10. As depicted in FIG. 2, the input side cell buffer section 10 is composed of a QoS DEMUX (Quality of Service Demultiplexer) 11 adapted to assign an ATM cell inputted from a line, based on header information, to a logical queue which is split logically for every QoS class, output path and VC (Virtual Channel), a cell temporary storing device 12 adapted to implement the logical queue, a logical queue controlling device 13 adapted to control writing and reading of cells into or from the logical queue, a logical queue length monitoring device 14 adapted to monitor each logical queue length based on writing and reading control information from the logical queue controlling device 13 and the QoS DEMUX 11, and a cell rewriting device 15 adapted to write information about the logical queue length fed from the logical queue monitoring device 14 into an idle region of an RM cell or an IRM cell to be inserted instead of an idle cell and to output a written cell to a switch section 20 (shown in FIG. 1).

The switch section 20 is used to switch the ATM cell inputted from the input side cell buffer section 10 for outputting to the output side cell buffer section 30. Its configurations are not related to the present invention and therefore a description of them is omitted.

Figure 3:
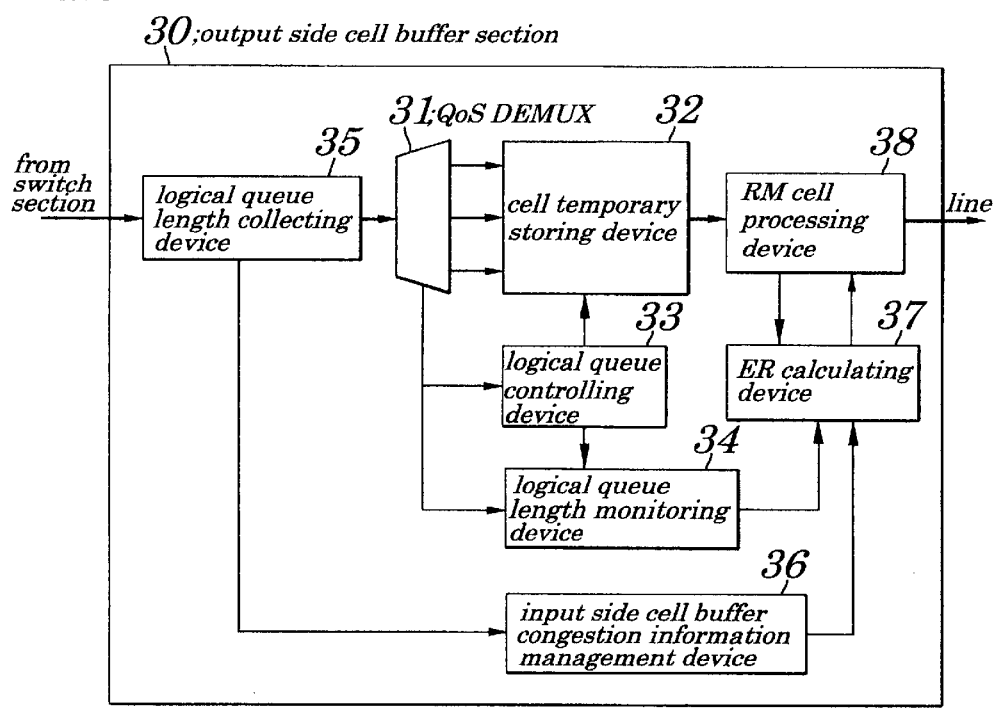
FIG. 3 is a schematic block diagram showing an example of configurations of a cell buffer section on an output side constituting the ATM switching system according to the embodiment of the present invention.

FIG. 3 is a schematic block diagram showing an example of configurations of the output side cell buffer section 30 constituting the ATM switching system according to the embodiment of the present invention. As shown in FIG. 3, the output side cell buffer section 30 is chiefly composed of a logical queue length collecting device 35 adapted to read congestion information stored in the input side cell buffer section 10 and to an input side cell buffer congestion information management device 36 when the ATM cell inputted from the switch section 20 is the RM cell or IRM cell, a QoS DEMUX 31 adapted to assign the ATM cell inputted through the logical queue length collecting device 35, based on its header information, to the logical queue to be logically split for every QoS class, output path or VC, a cell temporary storing device 32, a logical queue controlling device 33 adapted to control writing and reading of the cell to and from the logical queue, a logical queue length monitoring device 34 adapted to monitor each logical queue length based on writing and reading information fed from both the logical queue controlling device 33 and the QoS DEMUX 31, the input side cell buffer congestion information management device 36 adapted to store the congestion information read out by the logical queue length collecting device 35, an ER calculating device 37 adapted to calculate ER values based on logical queue information fed from the logical queue length monitoring device 34 and from the input side cell buffer congestion information management device 36, to compare those two values with an ER value of a backward RM cell and then to send a smallest value out of the ER values to an RM cell processing device 38 and the RM cell processing device 38 adapted to read out the ER value of the backward RM cell when the backward RM cell is inputted, to write the ER value fed from the ER calculating device 37 in the backward RM cell and then to output to a line.

Figure 4:
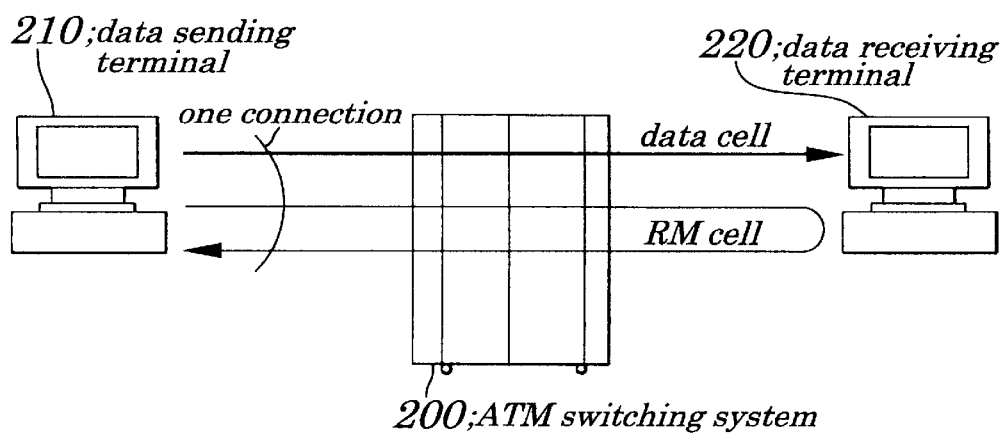
FIG. 4 is a diagram explaining a state in which a feedback-type congestion control is made in an ABR connection according to the embodiment of the present invention.

Operations of the ATM switching system of the present invention will be described below. First, a brief explanation of congestion control of ABR service class is given. FIG. 4 is a diagram explaining a state in which a feedback-type congestion control is made in an ABR connection according to the embodiment of the present invention. When the ABR connection is established between a data sending terminal 210 and a data receiving terminal 220, the RM cell in addition to user data is transferred together.

Figure 5:
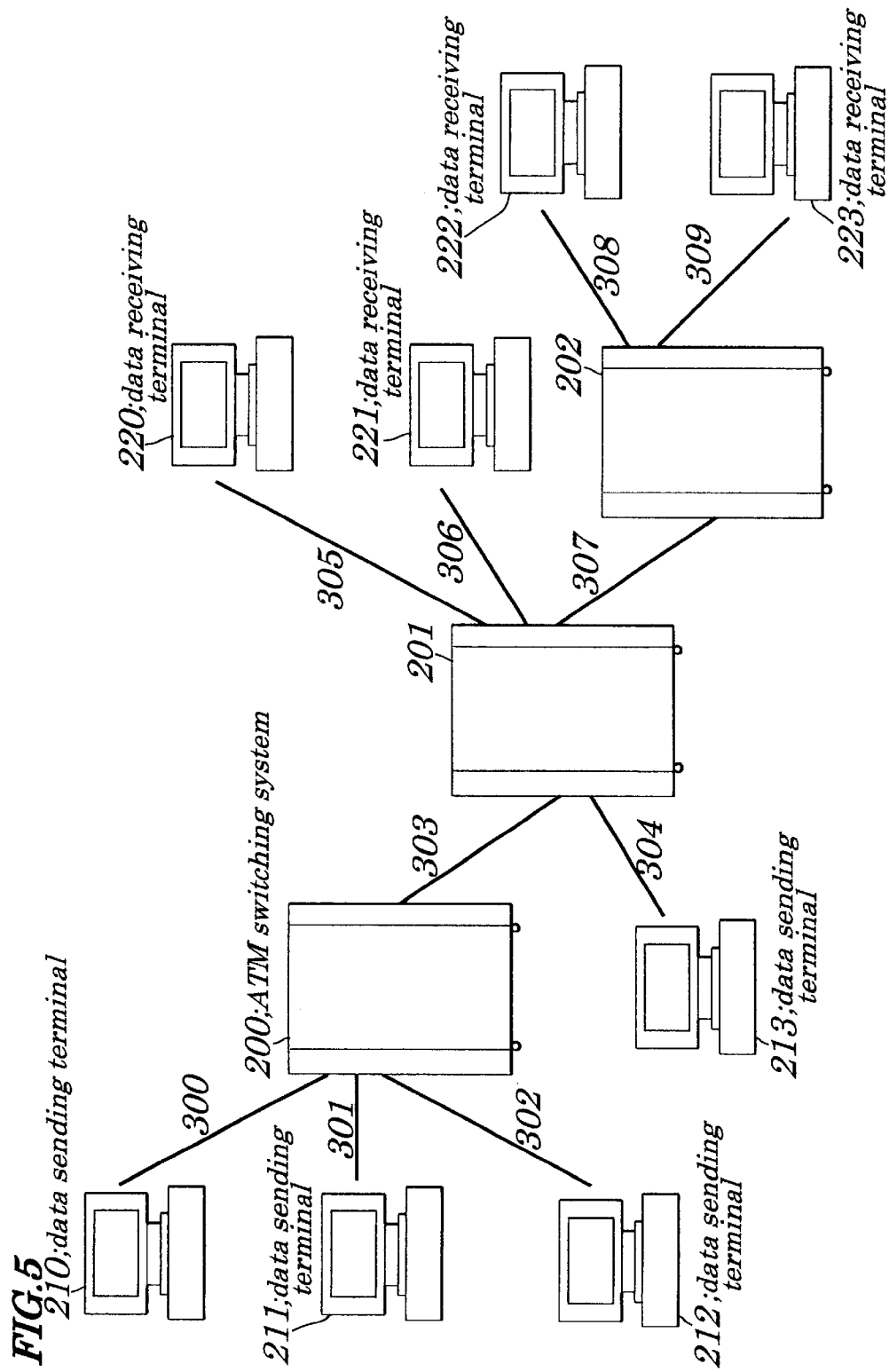
FIG. 5 is a schematic diagram showing an example of an ATM network configured by two or more ATM switching systems and two or more terminals in which an example of a "fair share" among a plurality of ABR connections is shown.

FIG. 5 is a diagram showing an example of an ATM network constructed by two or more ATM switching systems and two or more terminals in which an example of "fair share" among a plurality of ABR connections is shown. In the example of the ATM network, three ATM switching systems 200, 201 and 202, four data sending terminals 210, 211, 212, 213, four data receiving terminals 220, 221, 222 and 223 are connected through transmission paths 300, 301, 302, 303, 304, 305, 306, 307, 308 and 309 each having a 150 Mbps transmission band.

Through the transmission path 303 connected between the ATM switching systems 200 and 201, three connections are established, one being between the data sending terminal 210 and the data receiving terminal 220, another being between the data sending terminal 211 and the data receiving terminal 221, and a third being between the data sending terminal 212 and the data receiving terminal 222 and, therefore, a transmission band of 50 Mbps obtained by dividing the transmission band of 150 Mbps by three is assigned to each of the three connections. Moreover, through the transmission path 307 connected between the ATM switching systems 201 and 202, two connections are established, one being between the data sending terminal 212 and the data receiving terminal 222 and an other being between the data sending terminal 213 and the data receiving terminal 223, however, a transmission band of 75 Mbps obtained by dividing 150 Mbps by two is not assigned to each of the two connections, because the transmission band of the connection between the data sending terminal 212 and the data receiving terminal 222 is limited to 50 Mbps on the transmission path 303 connected between the ATM switching systems 200 and 201 and the transmission band of 100 Mbps obtained by subtracting 50 Mbps from the 150 Mbps is assigned to the connection between the data sending terminal 213 and the data receiving terminal 223.

Figure 6:
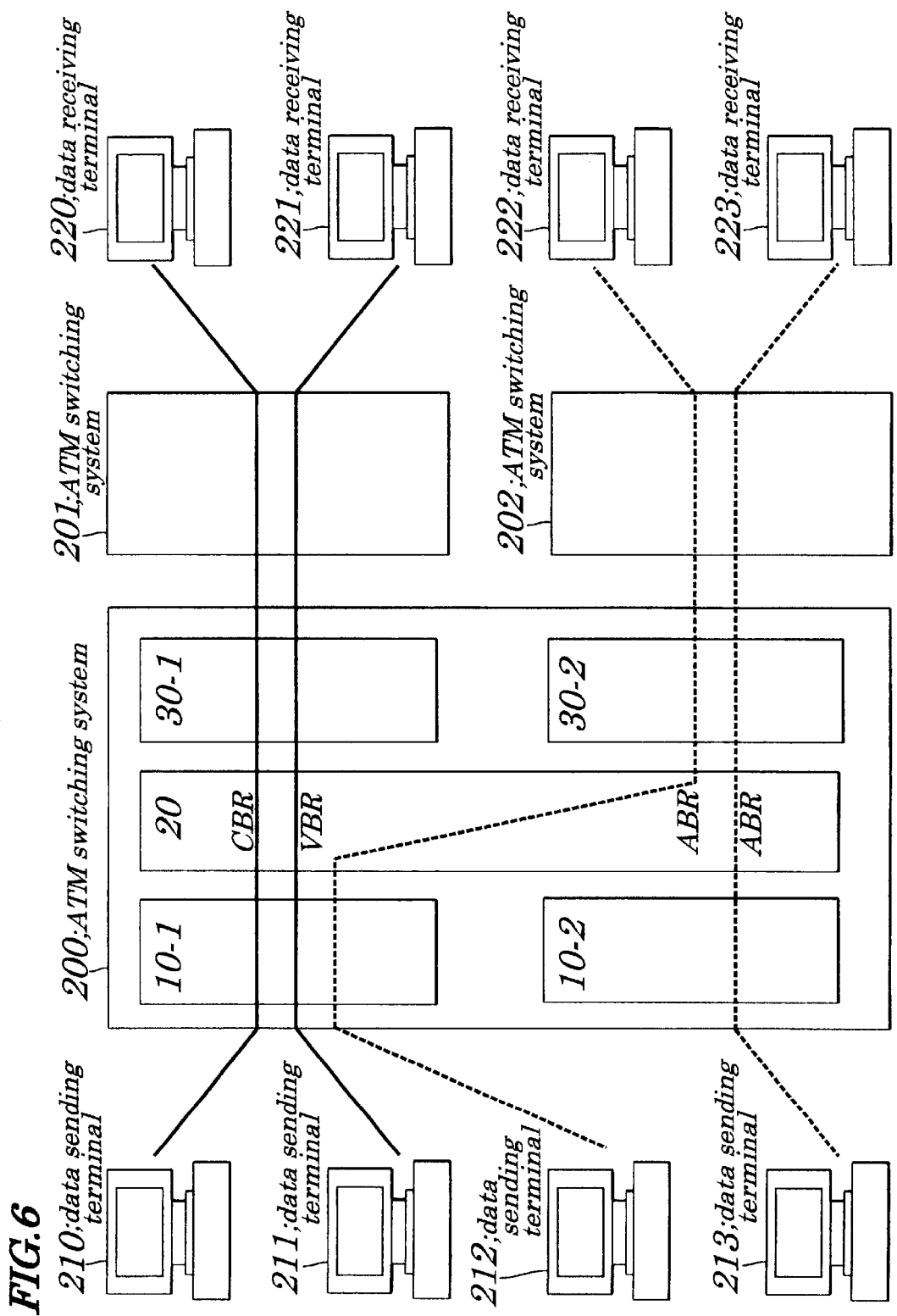
FIG. 6 is a diagram explaining an example in which the fair share cannot be achieved among the plurality of ABR connections.

Next, why the fair share cannot be ensured in a case where cell buffers on the input side are split is explained by referring to FIG. 6. The explanation is given by taking the case for example in which the ATM network is constructed by three ATM switching systems 200, 201 and 202, four data sending terminals 210, 211, 212 and 213, and four data receiving terminals 220, 221, 222 and 223.

In the example shown in FIG. 6, the three ATM switching systems 200, 201 and 202 are input/output buffer type ATM switching systems each having the input side cell buffer sections 10-1 and 10-2, the output side cell buffer sections 30-1 and 30-2 and the switch section 20 having two input ports and two output ports mounted therein. At a front portion of each of the input ports are mounted input side cell buffer sections 10-1 and 10-2. At a back portion of each of the output ports are mounted output side cell buffer sections 30-1 and 30-2.

A CBR (Constant Bit Rate) connection, for which a transmission band has been reserved, is established between the data sending terminal 210 and the data receiving terminal 220. A VBR (Variable Bit Rate) connection, for which the transmission band has been reserved, is established between the data sending terminal 211 and the data receiving terminal 221. An ABR connection is established between the data sending terminal 212 and the data receiving terminal 223 and between the data sending terminal 213 and the data receiving terminal 223.

The connections between the data sending terminal 210 and the data receiving terminal 220 and between the data sending terminal 211 and the data receiving terminal 221 are established through the input side cell buffer section 10-1, switch section 20 and output side cell buffer section 30-1 of the ATM switching system 200 and through the ATM switching system 201. The connection between the data sending terminal 212 and the data receiving terminal 222 is established through the input side buffer section 10-1, switch section 20 and output side cell buffer section 30-2 of the ATM switching system 200 and through the ATM switching system 202. The connection between the data sending terminal 213 and the data receiving terminal 223 is established through the input side cell buffer section 10-2, switch section 20 and output side cell buffer section 30-2 of the ATM switching system 200 and through the ATM switching system 202.

Cells inputted through the ABR connection using the input side cell buffer section 10-1 from the data sending terminal 212 tend to be readily accumulated in the input side cell buffer section 10-1 due to an existence of the cell inputted from the data sending terminals 210 and 211 for which the transmission band has been reserved. This causes a count of cells accumulated in the input side cell buffer section 10-1 to be increased, thus making the logical queue length large. As a result, it is judged that congestion has occurred and a function of controlling the congestion is activated, causing the data sending terminal 212 to be operated to decrease its cell sending rate.

On the other hand, no cells inputted from the data sending terminal 213 into the input side cell buffer section 10-2 are accumulated in the input side cell buffer section 10-2 because there are no connections for which the transmission band is reserved. As a result, the logical queue length is kept small and, since it is judged that there has occurred no congestion, the data sending terminal 213 is operated to increase its cell sending rate.

Thus, if existence of congestion is judged individually, since a difference in available transmission band is produced among the ABR connections passing through the same ATM switching system, the fair share among the ABR connections is impossible.

Operations of the ATM switching system will be described by referring to FIGS. 1, 2 and 3.

The ATM cell inputted from the line is fed to the input side cell buffer section 10 shown in FIG. 2. The QoS DEMUX 11 mounted on the input side cell buffer section 10 is configured so as to load a call control program and to have a logical queue number management table set for every connection from a processor device used to establish and cancel a call, and is operated to reference to the logical queue number management table by using header information of the ATM cell, to output the logical queue number to the logical queue controlling device 13, to the logical queue length monitoring device 14 and to output the cell to the cell temporary storing device 12. The logical queue controlling device 13 is adapted to instruct the cell temporary storing device 12 to write this cell therein. Moreover, the logical queue controlling device 13, if the cell to be read exists in the cell temporary storing device 12, is adapted to instruct the cell temporary storing device 12 to read it out and, together at a same time, to inform the logical queue length monitoring device 14 of the logical queue number of the read cell. The logical queue length monitoring device 14 is operated, based on the logical queue number fed from the QoS DEMUX 11 and the logical queue controlling device 13, to control the logical queue length of each logical queue and to transfer the logical queue length information to the cell rewriting device 15.

The ATM cell read from the cell temporary storing device 12 is inputted into the cell rewriting device 15 and, if the cell is the RM cell, congestion information is written into the cell which is outputted to the switch section 20. Moreover, when the idle cell is inputted, the cell is rewritten to be the IRM cell and the congestion information is written on the cell, which is outputted to the switch section 20. The reason why the IRM cell is inserted is to feed the congestion information of the input side cell buffer section 10 to the output side cell buffer section 30 to which the RM cell does not reach from the input side buffer section 10. Destination of the IRM cell is the output side cell buffer 30 to which the RM cell does not reach from the input side buffer section 10. The congestion information to be written into the cell that has to be transferred to the output side cell buffer section 30, as shown in FIG. 7, includes an input side cell buffer section number, its logical queue number, its logical queue length, output side cell buffer section number or a like.

The ATM cell outputted from the input side cell buffer section 10 is switched at the switch section 20 and then outputted to the output side cell buffer section 30 shown in FIG. 3. The logical queue length collecting device 35 mounted on the output side cell buffer section 30, if the input ATM cell is not the RM cell or IRM cell, is adapted to feed the input cell as it is to the QoS DEMUX 31. On the other hand, if the input ATM cell is the RM cell or IRM cell, congestion information at the input side cell buffer section 10 is read from the input cell and the read information is outputted to the input side cell buffer congestion information management device, and the idle cell is inserted instead of the IRM cell and the RM cell is transmitted to the QoS DEMUX 31. The QoS DEMUX 31, as in the case of the QoS DEMUX 11 mounted on the input side cell buffer section, is adapted to reference to the logical queue number control table by using header information of the inputted cell and to output the logical queue number to the logical queue controlling device 33 and the logical queue length monitoring device 34 and to output the cell to the cell temporary storing device 32. The logical queue controlling device 33 is operated to instruct the cell temporary storing device 32 to write the cell. Moreover, the logical queue controlling device 33, if the cell to be read exists in the cell temporary storing device 32, is adapted to instruct the cell temporary storing device 32 to read it out and, simultaneously, to inform the logical queue length monitoring device 34 of the logical queue number of the read cell.

The logical queue length monitoring device 34, based on the logical queue number fed from the QoS DEMUX 31 and the logical queue controlling device 33, is operated to control the logical queue length of each logical queue and to transmit the logical queue length information to the ER calculating device 37.

On the other hand, to the input side cell buffer congestion information management device 36 is inputted the congestion information of each input side cell buffer section read out at the logical queue length collecting device 35, and the logical queue length is controlled for every input side cell buffer section number and the logical queue length information is transmitted to the ER calculating device 37.

The ATM cell read out from the cell temporary storing device 32 is fed to the RM cell processing device 38. The RM cell processing device 38, if the inputted ATM cell is the cell other than the backward RM cell, is adapted to output the inputted ATM cell as it is to the line and, if the inputted ATM cell is the backward RM cell, to read the ER value written in an ER region of the cell, to transmit it to the ER calculating device 37, to write the ER value fed from the ER calculating device 37 into the ER region of the backward RM cell and then to output to the line.

The ER calculating device 37 is adapted to calculate the ER value from the input side cell buffer section logical queue length information fed from the input side cell buffer congestion information management device 36 and the ER value from the output side cell buffer section logical queue length information fed from the logical queue length monitoring device 34 and to compare these two ER values with a third ER value fed from the RM cell processing device 38 and to send a smallest value out of them as the ER value to the RM cell processing device 38 so as to be written into the backward RM cell.

As described above, according to the method for controlling congestion in the ATM switching system composed of a plurality of cell buffers, by setting the information indicating the most congested state, out of the three kinds of congestion information at the input side cell buffer, the information at the output side cell buffer and the information contained in the RM cell, to the backward RM cell, the fair share is ensured among ABR connections passing through the same ATM switching system.

It is thus apparent that the present invention is not limited to the above embodiments but may be changed and modified without departing from the scope and spirit of the invention.

Finally, the present application claims the priority of Japanese Patent Application No. Hei11-131304 filed on May 12, 1999, which is herein incorporated by reference.

What is claimed is:

1. A method for controlling congestion in an ATM (Asynchronous Transfer Mode) switching system containing an ABR (Available Bit Rate) service class and having a plurality of split input side cell buffer sections and a plurality of split output side buffer sections, comprising the steps of:
  a) monitoring a logical queue length stored within a cell buffer of each of said split input side cell buffer sections,
  b) writing information about said logical queue length into an idle field of an RM (Resource Management) cell or an IRM (Internal Resource Management) cell,
  c) transferring said information written in said RM cell or said IRM cell to each of said split output side cell buffer sections at a back portion,
  d) calculating a state of congestion of each of said split input side cell buffer sections based on information about said logical queue length and
  e) judging which input side cell buffer section is most congested by using a device mounted on each of said output side cell buffer sections.

2. A method for controlling congestion in an ATM (Asynchronous Transfer Mode) switching system containing an ABR (Available Bit Rate) service class and having a plurality of split input side cell buffer sections and a plurality of split output side buffer sections, comprising the steps of:
  a) monitoring a logical queue length stored within a cell buffer of each of said split input side cell buffer sections,
  b) writing information about said logical queue length into an idle field of an RM (Resource Management) cell or an IRM (Internal Resource Management) cell,
  c) transferring said information written in said RM cell or said IRM cell to each of said split output side cell buffer sections at a back portion,
  d) calculating a state of congestion of each of said input side cell buffer sections based on information about said logical queue length by using a device mounted on each of said output side cell buffer sections;
  e) comparing information about congestion of each of said input side cell buffer sections with information about congestion of said output cell buffer and with information about congestion contained in said RM cell or said IRM cell,
  f) rewriting said RM cell or said IRM cell with information indicating a most congested state out of three kinds of information about congested states and
  g) outputting rewritten said RM cell or said IRM cell by using said device mounted on each of said output side buffer sections.

* * * * *